(12) United States Patent
Ahn et al.

(10) Patent No.: US 10,187,359 B2
(45) Date of Patent: Jan. 22, 2019

(54) SECURE MESSAGE TRANSMISSION APPARATUS AND PROCESSING METHOD THEREOF

(71) Applicant: SAMSUNG ELECTRONICS CO., LTD., Suwon-si, Gyeonggi-do (KR)

(72) Inventors: Dave Ahn, Seoul (KR); Kyung-Soo Kwag, Suwon-si (KR); Ji-Yeon Choi, Suwon-si (KR); Sung-Hyun Hong, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 187 days.

(21) Appl. No.: 15/041,275

(22) Filed: Feb. 11, 2016

(65) Prior Publication Data

US 2016/0241523 A1 Aug. 18, 2016

(30) Foreign Application Priority Data

Feb. 12, 2015 (KR) ........................ 10-2015-0021896

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0822* (2013.01); *H04L 9/0894* (2013.01);
(Continued)

(58) Field of Classification Search
CPC ... H04L 63/0428; H04L 9/14; H04L 2209/24; H04L 9/0822; H04L 9/0894; H04L 63/0464

See application file for complete search history.

(56) References Cited

U.S. PATENT DOCUMENTS

| 8,863,252 B1 | 10/2014 | Katzer et al. |
| 2002/0065866 A1* | 5/2002 | Sueyoshi .............. G06F 21/445 718/102 |

(Continued)

FOREIGN PATENT DOCUMENTS

KR 10-2014-0123353 10/2014

OTHER PUBLICATIONS

Lisoněk et al., "SMS Encryption for Mobile Communication", Dec. 2008, International Conference on Security Technology, pp. 198-201 (Year: 2008).*

(Continued)

*Primary Examiner* — Kenneth W Chang
(74) *Attorney, Agent, or Firm* — Nixon & Vanderhye P.C.

(57) ABSTRACT

The disclosure provides a secure message transmission apparatus and a processing method thereof. A method for processing a secure message may include receiving a message transmitted by a transmission-side terminal and determining whether the message is an encrypted message, by a non-secure message service unit; delivering the encrypted message to a secure message service unit by the non-secure message service unit when the message is the encrypted message; and decrypting the encrypted message, and re-encrypting the decrypted message and transmitting the re-encrypted message to a reception-side terminal, by the secure message service unit.

11 Claims, 10 Drawing Sheets

(51) Int. Cl.
G06F 21/74 (2013.01)
G06F 21/86 (2013.01)
(52) U.S. Cl.
CPC .......... *H04L 63/0464* (2013.01); *G06F 21/74* (2013.01); *G06F 21/86* (2013.01)

(56) References Cited

U.S. PATENT DOCUMENTS

| | | |
|---|---|---|
| 2003/0223586 A1 | 12/2003 | Green et al. |
| 2007/0266444 A1* | 11/2007 | Segal .................. G06F 21/554 726/27 |
| 2010/0161984 A1 | 6/2010 | Pauker et al. |
| 2010/0292556 A1* | 11/2010 | Golden ................ A61B 5/7465 600/364 |
| 2012/0011357 A1 | 1/2012 | Finlay |
| 2012/0023158 A1* | 1/2012 | Kashyap ............. H04L 63/0428 709/203 |
| 2013/0145475 A1* | 6/2013 | Ryu ....................... G06F 21/31 726/26 |
| 2013/0297948 A1* | 11/2013 | Lee ...................... G06F 21/602 713/193 |
| 2013/0333005 A1 | 12/2013 | Kim et al. |
| 2014/0185806 A1 | 7/2014 | Mardikar |

OTHER PUBLICATIONS

Search Report and Written Opinion dated May 17, 2016 in counterpart International Patent Application No. PCT/KR2016/001402.
European Application Search Report dated Feb. 13, 2018 for EP Application No. 16749476.4.

* cited by examiner

SECURE MESSAGE TRANSMISSION APPARATUS AND PROCESSING METHOD THEREOF

CROSS-REFERENCE TO RELATED APPLICATION

This application is based on and claims the priority under 35 U.S.C. § 119 to Korean Application Serial No. 10-2015-0021896, which was filed in the Korean Intellectual Property Office on Feb. 12, 2015, the content of which is incorporated by reference herein in its entirety.

FIELD

The disclosure relates to a secure message transmission apparatus and a processing method thereof.

BACKGROUND

Portable terminal apparatuses are being widely used due to the convenience of use thereof, and the usability thereof is gradually increasing. For example, a portable terminal apparatus provides various functions, such as a game, banking, the use of public transport, health care, shopping, and the like, that a user needs, and thereby enables not only a voice call but also the processing of various pieces of information and communication even during movement of the portable terminal.

The convenience of use of the portable terminal increases the usability thereof. Accordingly, poor use is made of the above-described property of the portable terminal, and there is also a gradual increase in security incidents, such as smishing in which a malicious code is installed when an Internet address within a message is clicked and small-sum settlement damage occurs or financial information is extorted while a potential victim does not know, and phishing in which criminals pose as a financial institution or a public institution, require, through a telephone or an email, a potential victim to enter a serial number and a code number of his/her security card on an Internet site, and extort financial information.

Conventionally, in order to prevent the security incidents, when an Internet address is included in a message, most frequently used methods are a method for verifying a text message by authenticating the Internet address through an authenticated application, or a method for verifying an originator of the message by representing a predetermined mark signifying that a received text message does not include an illegal element and/or a security element.

However, the conventional method for verifying the contents of the message or verifying the originator thereof after the message is received may be exposed to another security danger by a man-in-the-middle in a process of delivering the message from the originator to the recipient.

For example, when a man-in-the-middle attack occurs in a process where the originator delivers a secure message to a service apparatus, and in a process where the service apparatus delivers the secure message, which has been received from the originator, to the recipient, the secure message may be extorted as it is, and the contents of the message may be changed and the message including the changed contents may be delivered to the recipient.

Also, even when a message is encrypted, encryption/decryption keys may be exposed in a process of decrypting the encrypted text message, or the contents of the decrypted text message may be leaked by using a method for capturing a screen of a reception terminal apparatus.

SUMMARY

Accordingly, an aspect of the disclosure is to provide a secure message transmission apparatus and a processing method thereof which can encrypt or decrypt a message in a secure domain which is based on a secure operating system and which is physically separated from a non-secure domain which is based on a non-secure operating system, and can securely transmit a secure message requiring security.

Another aspect of the disclosure is to provide a secure message transmission apparatus and a processing method thereof which can fundamentally block access in the non-secure domain by a physical isolation environment between the secure domain and the non-secure domain, and thereby can pre-empt security incidents due to the leakage of a security key stored in the secure domain, the change/extortion of the contents of an output message, and the like.

In accordance with an example of the disclosure, a transmission-side terminal is provided. The transmission-side terminal may include a communication unit, e.g., communication circuitry, configured to transmit/receive an encrypted message; and a control unit having a secure domain and a non-secure domain which are based on a secure operating system and a non-secure operating system, respectively, and which are physically separated from each other, said control unit including processing circuitry configured to receive a message as input in the secure domain and to encrypt the received massage, and to deliver the encrypted message to the non-secure domain and to transmit the encrypted message to a message service apparatus through the communication unit.

In accordance with another example of the disclosure, a reception-side terminal is provided. The reception-side terminal may include a communication unit, e.g., communication circuitry configured to transmit/receive an encrypted message; and a control unit having a secure domain and a non-secure domain which are based on a secure operating system and a non-secure operating system, respectively, and which are physically separated from each other, said control unit including processing circuitry configured to decrypt the encrypted message received through the communication unit and to output the decrypted message in the secure domain.

In accordance with still another example of the disclosure, a message service apparatus is provided. The message service apparatus may include a non-secure message service unit including processing circuitry configured to receive a message transmitted by a transmission-side terminal and to transmit the received message to a reception-side terminal, and to deliver the received message using a secure message service when the message is an encrypted message; and a secure message service unit including processing circuitry configured to decrypt the encrypted message delivered by the non-secure message service unit, and to re-encrypt the decrypted message and to deliver the re-encrypted message to the reception-side terminal.

In accordance with yet another example of the disclosure, a method for processing a secure message in a transmission-side terminal is provided. The method may include receiving as input and encrypting a message from a secure message processing unit installed in a secure domain which is based on a secure operating system and which is physically separated from a non-secure domain which is based on a non-secure operating system; and receiving the encrypted message and transmitting the encrypted message to a message service apparatus by a non-secure message processing unit installed in the non-secure domain.

In accordance with yet another example of the disclosure, a method for processing a secure message in a reception-side terminal is provided. The method may include determining, by a non-secure message processing module installed in a non-secure domain based on a non-secure operating system and physically isolated from a secure domain based on a secure operating system, whether a message transmitted by a message service apparatus is an encrypted message; delivering the encrypted message to the secure domain by the non-secure message processing unit when the transmitted message is the encrypted message; and receiving and decrypting the encrypted message; and outputting the decrypted message by a secure message processing unit installed in the secure domain.

In accordance with further example of the disclosure, a method for processing a secure message in a message service apparatus is provided. The method may include receiving a message transmitted by a transmission-side terminal and determining, by a non-secure message service unit, whether the message is an encrypted message; delivering the encrypted message to a secure message service unit by the non-secure message service unit when the message is the encrypted message; and decrypting the encrypted message, and re-encrypting the decrypted message and transmitting the re-encrypted message to a reception-side terminal, by the secure message service unit.

According to various examples of the disclosure, encryption/decryption keys are stored in a secure domain which is based on a secure operating system and is physically separated from a non-secure domain which is based on a normal operating (e.g., non-secure) system, and a secure message is encrypted or decrypted in the secure domain using the encryption/decryption keys. Accordingly, the reliability of the transmission of a secure message can be improved.

The secure message requiring security is output under the control of the secure domain when the secure message requiring security is output, and thus access in the non-secure domain, which is physically separated from the secure domain, is fundamentally blocked. Accordingly, even when the secure message is output, it is possible to pre-empt and/or reduce security incidents due to the change, leakage, and extortion of the contents of the message, and the like which are caused by a man-in-the-middle attack.

BRIEF DESCRIPTION OF THE DRAWINGS

The above and other aspects, features, and advantages of the disclosure will be more apparent from the following detailed description, taken in conjunction with the accompanying drawings, in which like reference numerals refer to like elements, and wherein.

DETAILED DESCRIPTION

Figure 1:
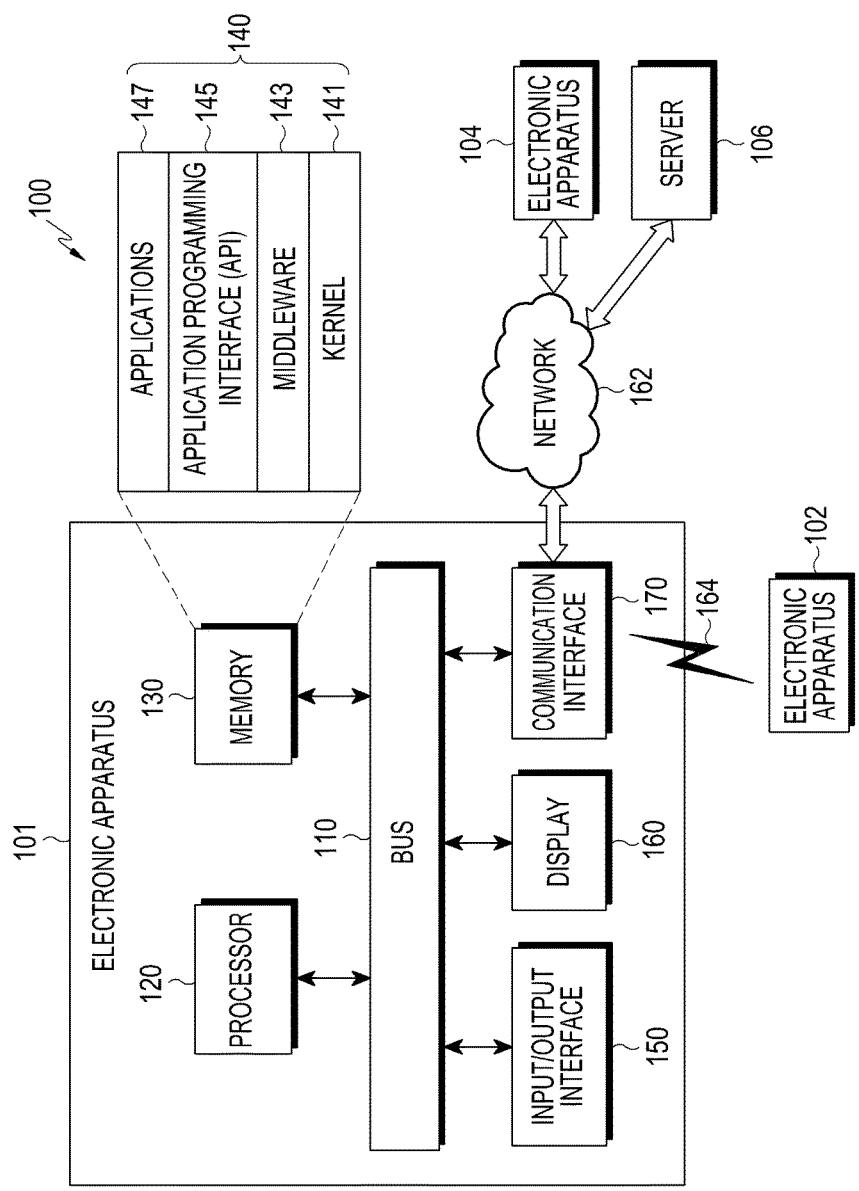
FIG. 1 is a diagram illustrating an example network environment.

Hereinafter, various example embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of the various example embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various example embodiments of the disclosure may modify various components regardless of their order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or another element (e.g., third element) may be interposed between them. It may be understood that when an element (e.g., first element) is referred to as being "directly connected," or "directly coupled" to another element (second element), there may be no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. In some situations, the expression "device configured to" may mean that the device, together with other devices or components, "is able to". For example, the phrase "processor adapted (or configured) to perform A, B, and C" may mean a dedicated processor (e.g. embedded processor)

only for performing the corresponding operations or a general-purpose processor (e.g., central processing unit (CPU) or application processor (AP)) that can perform the corresponding operations by executing one or more software programs stored in a memory device.

The terms used herein are merely for the purpose of describing example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various example embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like. According to various example embodiments, the wearable device may include, for example, at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like.

According to some example embodiments, the electronic device may, for example, be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like.

According to another example embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like.

According to some example embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter), or the like. The electronic device according to various example embodiments of the disclosure may, for example, be a combination of one or more of the aforementioned various devices. The electronic device according to some example embodiments of the disclosure may be a flexible device, or the like. Further, the electronic device according to an example embodiment of the disclosure is not limited to the aforementioned devices, and may include a new electronic device according to the development of technology An electronic device according to various example embodiments will be described with reference to the accompanying drawings. As used herein, the term "user" may indicate a person who uses an electronic device or a device (e.g., an artificial intelligence electronic device) that uses an electronic device.

Referring to FIG. 1, an electronic apparatus 101 within a network environment 100, according to various example embodiments of the disclosure, will be described. The electronic apparatus 101 may include a bus 110, a processor (e.g., including processing circuitry) 120, a memory 130, an input/output interface (e.g., including interface circuitry) 150, a display 160, and a communication interface (e.g., including communication circuitry) 170. In some example embodiments of the disclosure, at least one of the above elements of the electronic apparatus 101 may be omitted from the electronic apparatus 101, or the electronic apparatus 101 may additionally include other elements.

The bus 110 may include, for example, a circuit that interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120 may be configured to perform, for example, calculations or data processing related to control over and/or communication by at least one of the other elements of the electronic apparatus 101.

The memory 130 may include, for example, a volatile memory and/or a non-volatile memory. The memory 130 may store, for example, commands or data related to at least one of the other elements of the electronic apparatus 101. According to an example embodiment of the disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)."

For example, the kernel 141 may control or manage system resources (e.g., the bus 110, the processor 120, the memory 130, and the like) used to execute operations or functions implemented by the other programs (e.g., the middleware 143, the API 145, and the application program 147). Also, the kernel 141 may provide an interface capable of controlling or managing the system resources by accessing the individual elements of the electronic apparatus 101 by using the middleware 143, the API 145, or the application program 147.

For example, the middleware 143 may serve as an intermediary that enables the API 145 or the application program 147 to communicate with the kernel 141 and to exchange data therewith.

The middleware 143 may, for example, process one or more task requests received from the application program 147 based on a priority. For example, the middleware 143 may assign a priority, which enables the use of system resources (e.g., the bus 110, the processor 120, the memory 130, etc.) of the electronic apparatus 101, to at least one of the application programs 147. For example, the middleware 143 may perform scheduling, load balancing, or the like of the one or more task requests by processing the one or more task requests based on the priority assigned to the at least one of the application programs 147.

The API 145 may include, for example, an interface through which the application 147 controls a function provided by the kernel 141 or the middleware 143, and may include, for example, at least one interface or function (e.g., command) for file control, window control, image processing, character control, or the like.

For example, the input/output interface 150 may serve as an interface capable of delivering a command or data, which is input from a user or another external device, to the element(s) other than the input/output interface 150 within the electronic apparatus 101. The input/output interface 150 may output, to the user or another external device, commands or data received from the element(s) other than the input/output interface 150 within the electronic apparatus 101.

Examples of the display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display, or the like. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may be configured to establish, for example, communication between the electronic apparatus 101 and an external apparatus (e.g., a first external electronic apparatus 102, a second external electronic apparatus 104, or a server 106). For example, the communication interface 170 may be connected to a network 162 through wireless or wired communication and may communicate with the external device (e.g., the second external electronic apparatus 104 or the server 106).

The wireless communication may, for example, be performed using at least one of, for example, Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM), or the like, as a cellular communication protocol. Examples of the wireless communication may include short-range communication 164. The short-range communication 164 may, for example, be performed using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter "Beidou"), and a European Global Satellite-based Navigation System (Galileo), according to a use area, a bandwidth, or the like. In the disclosure, the term "GPS" may be interchangeably used with the term "GNSS." The wired communication may be performed by using at least one of, for example, a Universal Serial Bus (USB), a High Definition Multimedia Interface (HDMI), Recommended Standard 232 (RS-232), and a Plain Old Telephone Service (POTS), or the like. The network 162 may include at least one of communication networks, such as a computer network (e.g., a Local Area Network (LAN), or a Wide Area Network (WAN)), the Internet, and a telephone network, or the like.

Each of the first and second external electronic apparatuses 102 and 104 may be of a type identical to or different from that of the electronic apparatus 101. According to an example embodiment of the disclosure, the server 106 may include a group of one or more servers. According to various example embodiments of the disclosure, all or some of operations performed by the electronic apparatus 101 may be performed by another electronic apparatus or multiple electronic apparatuses (e.g., the first and second external electronic apparatuses 102 and 104 or the server 106). According to an example embodiment of the disclosure, when the electronic apparatus 101 needs to perform some functions or services automatically or by a request, the electronic apparatus 101 may send, to another device (e.g., the first external electronic apparatus 102, the second external electronic apparatus 104, or the server 106), a request for performing at least some functions related to the functions or services, instead of performing the functions or services by itself, or additionally. Another electronic apparatus may execute the requested functions or the additional functions, and may deliver a result of the execution to the electronic apparatus 101. The electronic apparatus 101 may process the received result without any change or additionally and may provide the requested functions or services. To this end, use may be made of, for example, cloud computing technology, distributed computing technology, or client-server computing technology, or the like.

Figure 2:
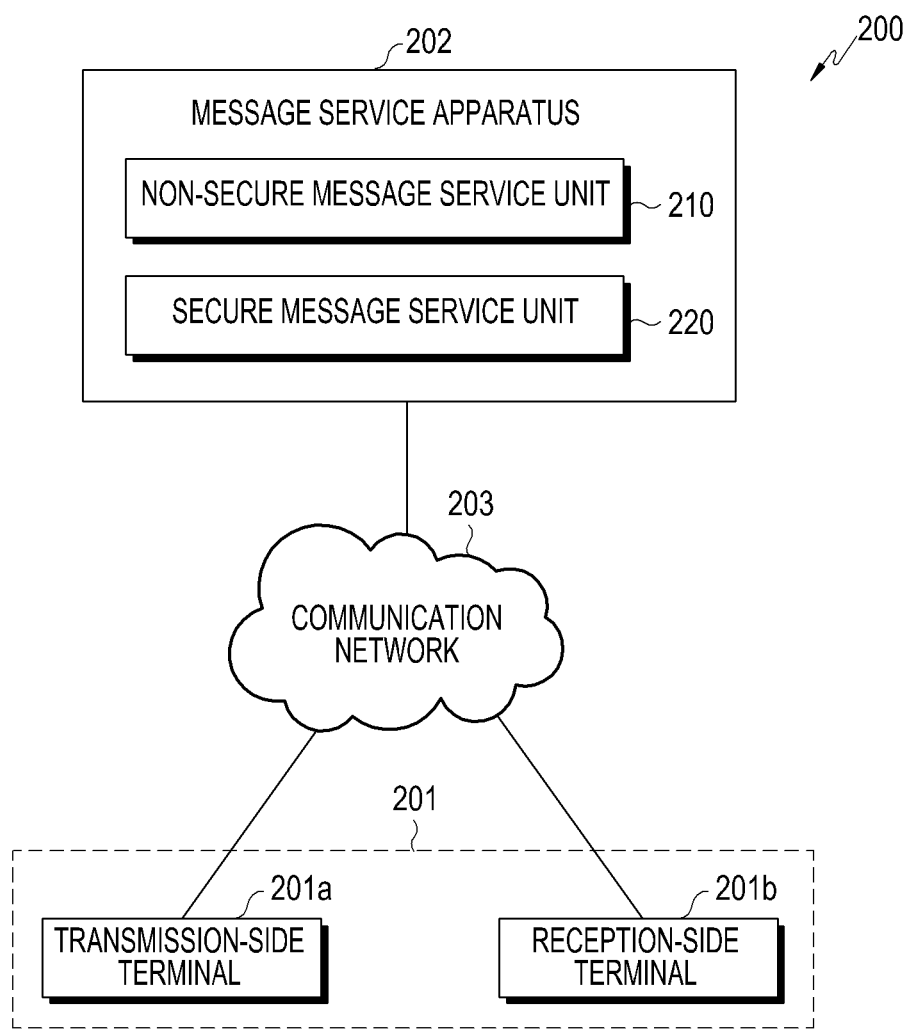
FIG. 2 is a schematic diagram illustrating an example secure message transmission system.

FIG. 2 is a diagram schematically illustrating an example secure message transmission system.

Referring to FIG. 2, the example secure message transmission system 200, may include terminal apparatuses 201a and 201b, each of which is connected to a communication network 203 and which transmit/receive a normal message and a secure message, and a message service apparatus 202.

The terminal apparatuses 201a and 201b are electronic apparatuses that can transmit/receive data to/from each other through the communication network 203, and each of the terminal apparatuses 201a and 201b may include, for example, the whole or part of the electronic apparatus 101 illustrated in FIG. 1. The terminal apparatuses 201a and 201b may, for example, have an identical configuration. For convenience of description, the terminal apparatuses 201a and 201b may be distinguished from each other, and may be referred to as, for example, the "transmission-side terminal 201a" and the "reception-side terminal 201b." The terminal apparatuses 201a and 201b may access the message service apparatus 202 through the communication network 203, and may securely transmit/receive not only a normal (e.g., non-secure) message but also a secure message requiring security to/from each other.

The message service apparatus 202 is connected to the terminal apparatuses 201a and 201b through the communication network 203, and provides a message transmission service which transmits a normal message and/or a secure message including one or more of text, an image, and a voice between the terminal apparatuses 201a and 201b.

The message service apparatus 202 may, for example, receive a normal message and/or a secure message, the transmission of which has been requested by the transmission-side terminal 201a, and may transmit the received normal message and/or secure message to the reception-side terminal 201b. The message service apparatus 202 may include, for example, a non-secure message service unit 210 that provides a service transmitting a normal message between the terminal apparatuses 201a and 201b, and a secure message service unit 220 that provides a service transmitting a secure message requiring security between the terminal apparatuses 201a and 201b.

The non-secure message service unit (e.g., including processing circuitry) 210 may be configured to receive a normal message, the transmission of which to the predetermined reception-side terminal 201b has been requested by the transmission-side terminal 201a, and may be configured to transmit the received normal message to the relevant reception-side terminal 201b. The secure message service unit (e.g., including processing circuitry) 220 may be configured to receive a secure message, the transmission of which to the predetermined reception-side terminal 201b has been requested by the transmission-side terminal 201a, and may transmit the received secure message to the relevant reception-side terminal 201b.

When a normal message, the transmission of which has been requested by the transmission-side terminal 201a, and a request requiring security are transmitted together, the non-secure message service unit 210 may be configured to deliver the normal message to the secure message service unit 220. In this case, the secure message service unit 220 may be configured to encrypt the delivered normal message and may be configured to transmit the encrypted normal message to the relevant reception-side terminal 201b.

The secure message service unit 220 may be configured to receive an encrypted secure message in order to transmit a secure message between the secure message service unit 220 and the transmission-side terminal 201a, may be configured to decrypt the encrypted secure message, may be configured to re-encrypt the decrypted secure message in order to transmit a secure message between the secure message service unit 220 and the relevant reception-side terminal 201b, and may be configured to transmit the re-encrypted secure message to the relevant reception-side terminal 201b. The secure message service unit 220 will be described below in greater detail with reference to FIG. 6.

The communication network 203 may, for example, be a medium that connects the terminal apparatuses 201a and 201b to the message service apparatus 202 and delivers various types of data, including a normal message, a secure message, multiple encryption/decryption key pairs, and the like between the terminal apparatuses 201a and 201b and the message service apparatus 202. The communication network 203 may include, for example, the whole or part of the network 162 illustrated in FIG. 1.

Figure 3:
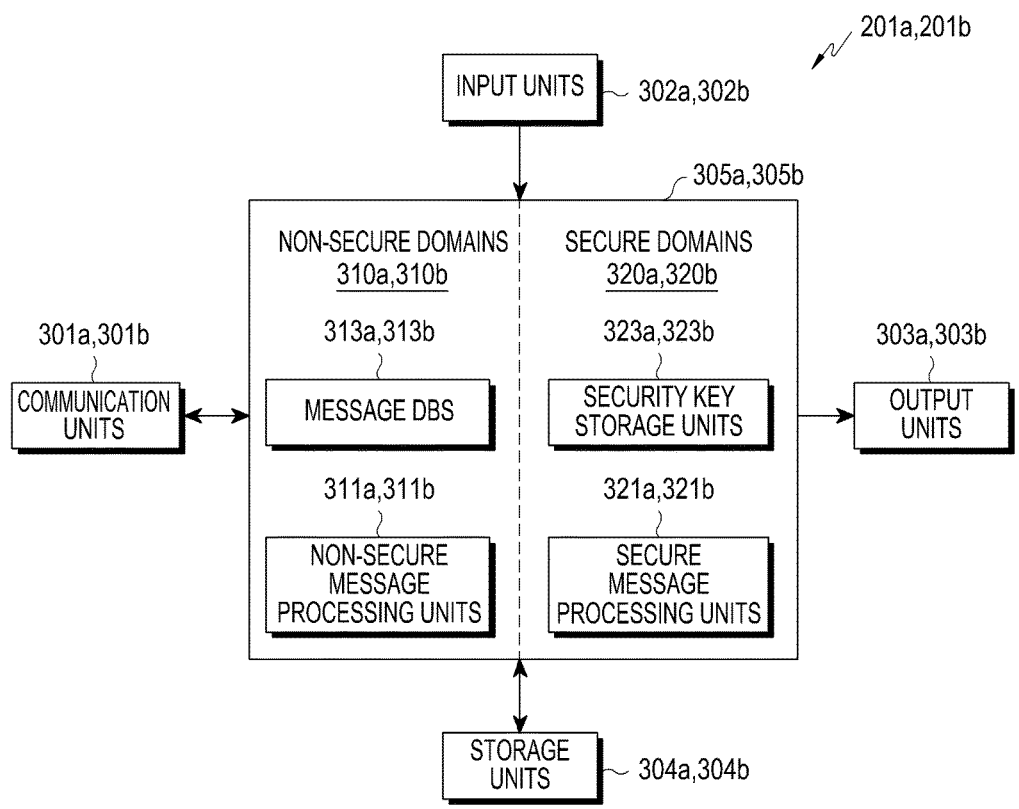
FIG. 3 is a block diagram illustrating an example schematic configuration of each of example terminal apparatuses.

FIG. 3 is a block diagram illustrating an example schematic configuration of each of example terminal apparatuses.

Referring to FIG. 3, the respective terminal apparatuses 201a and 201b may include, for example, communication units (e.g., including communication circuitry) 301a and 301b, input units (e.g., including input circuitry) 302a and 302b, output units (e.g., including output circuitry) 303a and 303b, storage units 304a and 304b, and control units (e.g., including processing circuitry) 305a and 305b. In the example, in order to distinguish the elements of the terminal apparatus 201a from those of the terminal apparatus 201b, the elements of the transmission-side terminal 201a are denoted by "a" and those of the reception-side terminal 201b are denoted by "b."

The communication units 301a and 301b enable the transmission/reception of a normal message and/or an encrypted secure message requiring security between the terminal apparatuses 201a and 201b and the message service apparatus 202 through the communication network 203 (see, e.g., FIG. 2). For example, the communication unit 301a of the transmission-side terminal 201a may transmit a normal message and/or an encrypted secure message, which is written by the transmission-side terminal 201a, to the message service apparatus 202. The message service apparatus 202 may transmit the normal message and/or the encrypted secure message, which has been received from the transmission-side terminal 201a, to the reception-side terminal 201b. The communication unit 301b of the reception-side terminal 201b may receive the normal message and/or the encrypted secure message transmitted by the message service apparatus 202.

The communication units 301a and 301b may transmit/receive multiple encryption/decryption key pairs so as to exchange the multiple encryption/decryption key pairs generated in order to transmit a secure message between the terminal apparatuses 201a and 201b and the message service apparatus 202 through the communication network 203.

For example, the communication units 301a and 301b may be configured to transmit or receive a first encryption key and/or a first decryption key so as to exchange a first encryption/decryption key pair generated, for example, based on a predetermined key generation algorithm in order to transmit a secure message between the transmission-side terminal 201a and the reception-side terminal 201b. For example, the communication unit 301a of the transmission-side terminal 201a may receive the first encryption key from the reception-side terminal 201b, or may transmit the first decryption key to the reception-side terminal 201b. The communication unit 301b of the reception-side terminal 201b may receive the first decryption key from the transmission-side terminal 201a, or may transmit the first encryption key to the transmission-side terminal 201a. The communication unit 301a of the transmission-side terminal 201a may receive a second encryption key from the message service apparatus 202, or may transmit the second decryption key to the message service apparatus 202, so as to exchange a second encryption/decryption key pair generated based on a predetermined key generation algorithm in order to transmit a secure message between the transmission-side terminal 201a and the message service apparatus 202. The communication unit 301b of the reception-side terminal 201b may receive a third decryption key from the message service apparatus 202, or may transmit a third encryption key to the message service apparatus 202, so as to exchange a third encryption/decryption key pair generated based on a predetermined key generation algorithm in order to transmit a secure message between the reception-side terminal 201b and the message service apparatus 202.

The input units 302a and 302b are elements that receive various types of inputs, including a message, from, for example, a user. The input units 302a and 302b may include, for example, keys for inputting numeric and text information and function keys for setting various functions, and output, to the control units 305a and 305b, input signals generated from the keys and the function keys. Under the control of the control units 305a and 305b, the input units 302a and 302b may receive inputs in a non-secure domain, which is based on a normal operating system, and a secure domain which is physically separated from the non-secure domain and is based on a secure operation system. When the input units 302a and 302b receive inputs in the secure domain, access in the non-secure domain may be fundamentally blocked using an isolation environment physically separated from the secure domain, and thus may securely receive various types of inputs, including a message, without an attacker in-the-middle (e.g., man-in-the-middle) attack. Each of the input units 302a and 302b may include a key button, a keypad, a touch screen, and/or the like which may be typically included in a portable terminal.

The output units 303a and 303b are elements that output messages received from the input units 302a and 302b, or output a normal message and/or an encrypted secure message transmitted by the transmission-side terminal 201a and/or the message service apparatus 202. Under the control of the control units 305a and 305b, the output units 303a and 303b may output the relevant messages in the non-secure domain or the secure domain. Similarly, when the output units 303a and 303b provide outputs in the secure domain, access in the non-secure domain may be fundamentally blocked using an isolation environment physically separated from the secure domain, so that it is possible to pre-empt and/or reduce/avoid security-related incidents, such as the change, leakage, extortion, and screen capture of the contents of a message, and the like by an attacker-in-the-middle. The output units 303a and 303b may include a display, a speaker, and/or the like which may typically be included in the portable terminal.

The storage units (e.g., including a memory) 304a and 304b may store an application program for basic functions of the portable terminal, an application program selectively installed by the user, and/or the like. The storage units 304a and 304b may store messages received as input by the input units 302a and 302b, may store secure messages which are input and encrypted in the secure domain by the control units 305a and 305b described below, or may store a normal message and/or an encrypted secure message received by the communication units 301a and 301b.

The control units 305a and 305b include control and/or processing circuitry (e.g., controllers, processors, or the like) that may generally be configured to control the operations of the respective functional units, and may be configured to perform an overall operation of securely processing a message according to whether the message is encrypted.

The control units 305a and 305b may be configured in such a manner that non-secure domains 310a and 310b, which operate based on a normal operating system, are physically separated from secure domains 320a and 320b which operate based on a secure operating system. In the non-secure domains 310a and 310b, non-secure message processing units 311a and 311b may be installed, and a normal message which does not require security may be processed by the non-secure message processing units 311a and 311b. In the secure domains 320a and 320b, secure message processing units 321a and 321b may be installed, and an encrypted message which requires security may be processed by the secure message processing units 321a and 321b.

The non-secure domains 310a and 310b may further include message DataBases (DBs) 313a and 313b capable of storing normal messages, which are generated by the non-secure message processing units 311a and 311b, and encrypted messages which are generated by the secure message processing units 321a and 321b.

The secure domains 320a and 320b may further include security key storage units 323a and 323b that store multiple encryption/decryption keys which are used to encrypt messages which are input through the secure message processing units 321a and 321b, or are used to decrypt encrypted secure messages received by the communication units 301a and 301b. The security key storage units 323a and 323b are installed in the secure domains 320a and 320b, which are physically separated from the non-secure domains 310a and 310b, and thus access from the non-secure domains 310a and 310b is physically blocked. Accordingly, it is possible to pre-empt and/or reduce or avoid the leakage and extortion of encryption/decryption keys by an attacker-in-the-middle.

Figure 7:
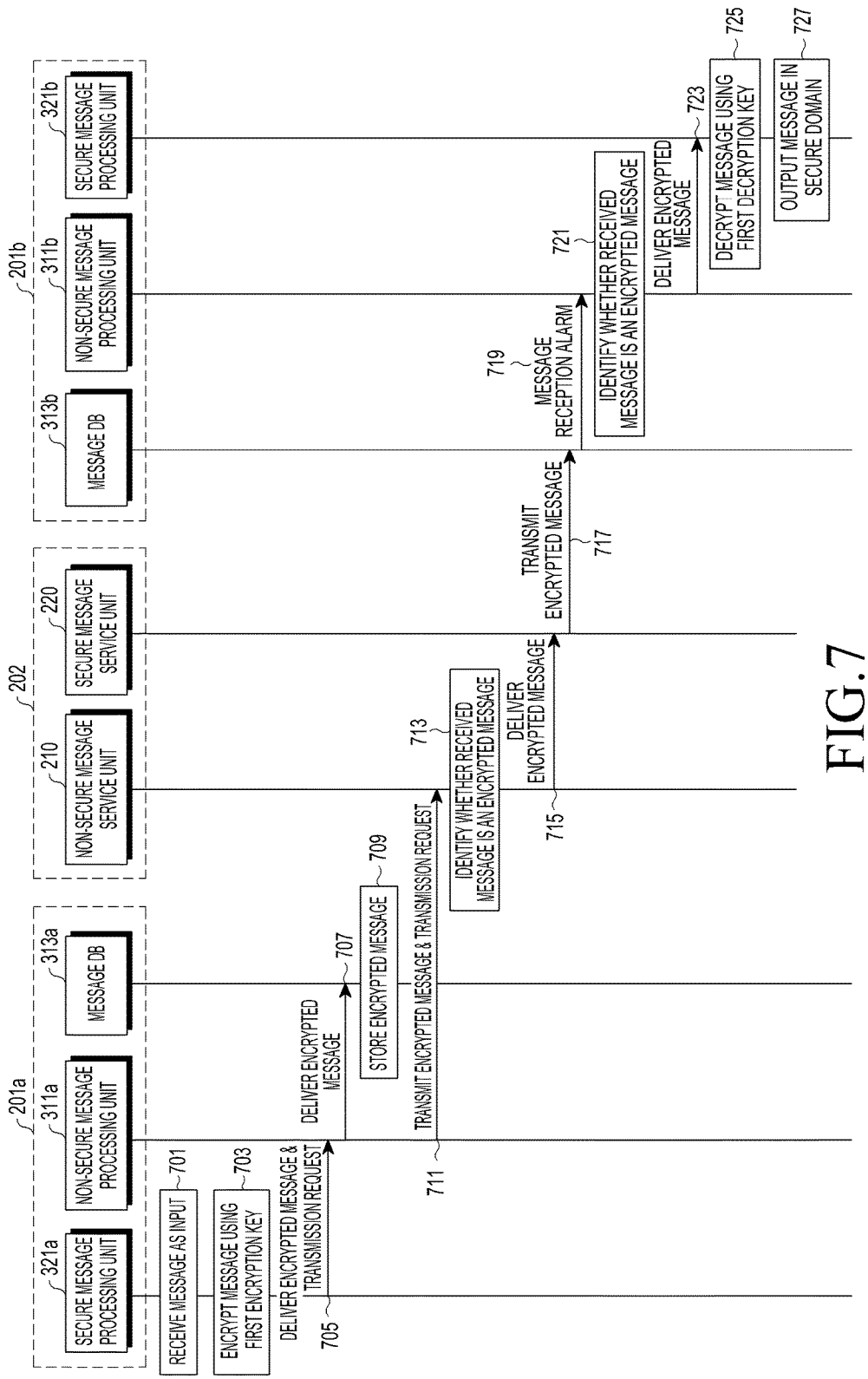
FIG. 7 is a signal flow diagram illustrating an example method of processing a secure message.
Figure 8A:
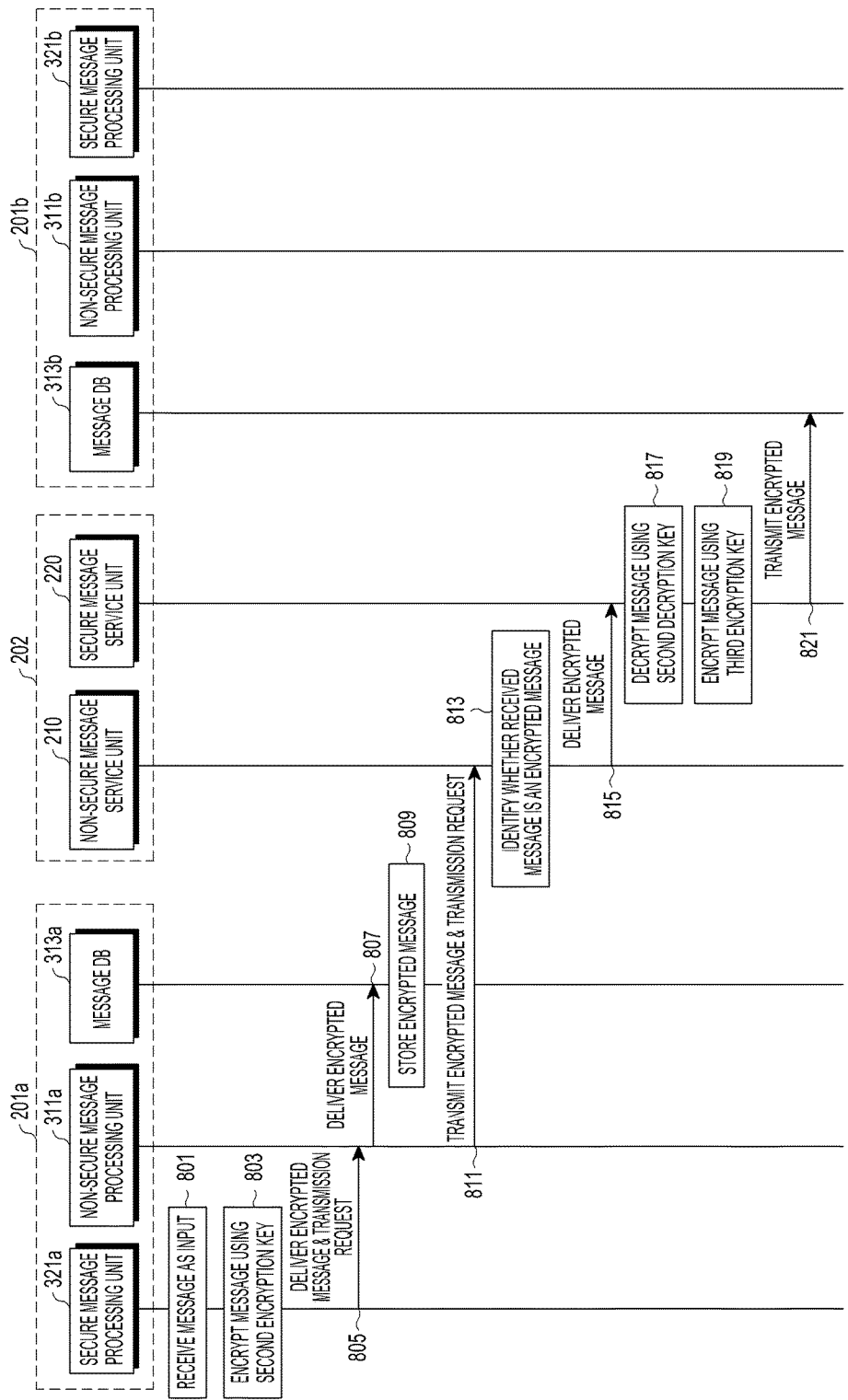
FIGS. 8A and 8B are signal flow diagrams illustrating an example method of processing a secure message.
Figure 8B:
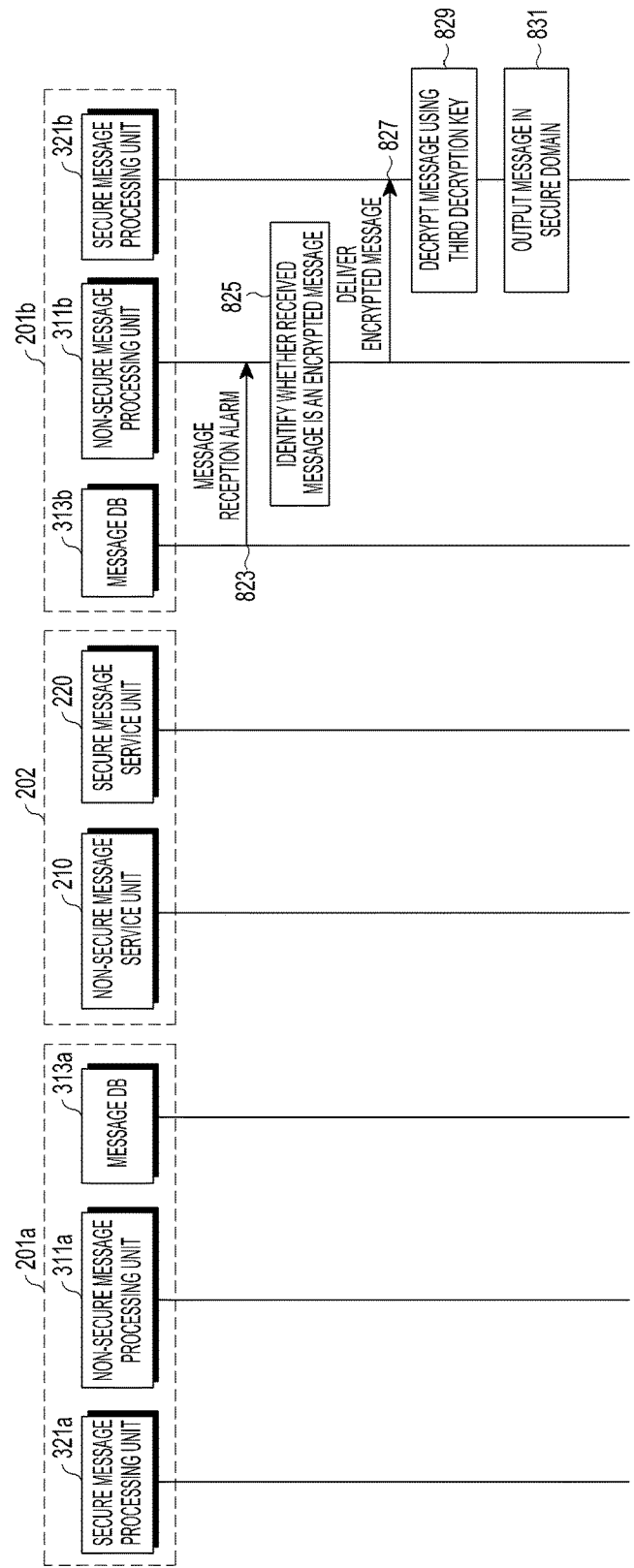
Figure 9:
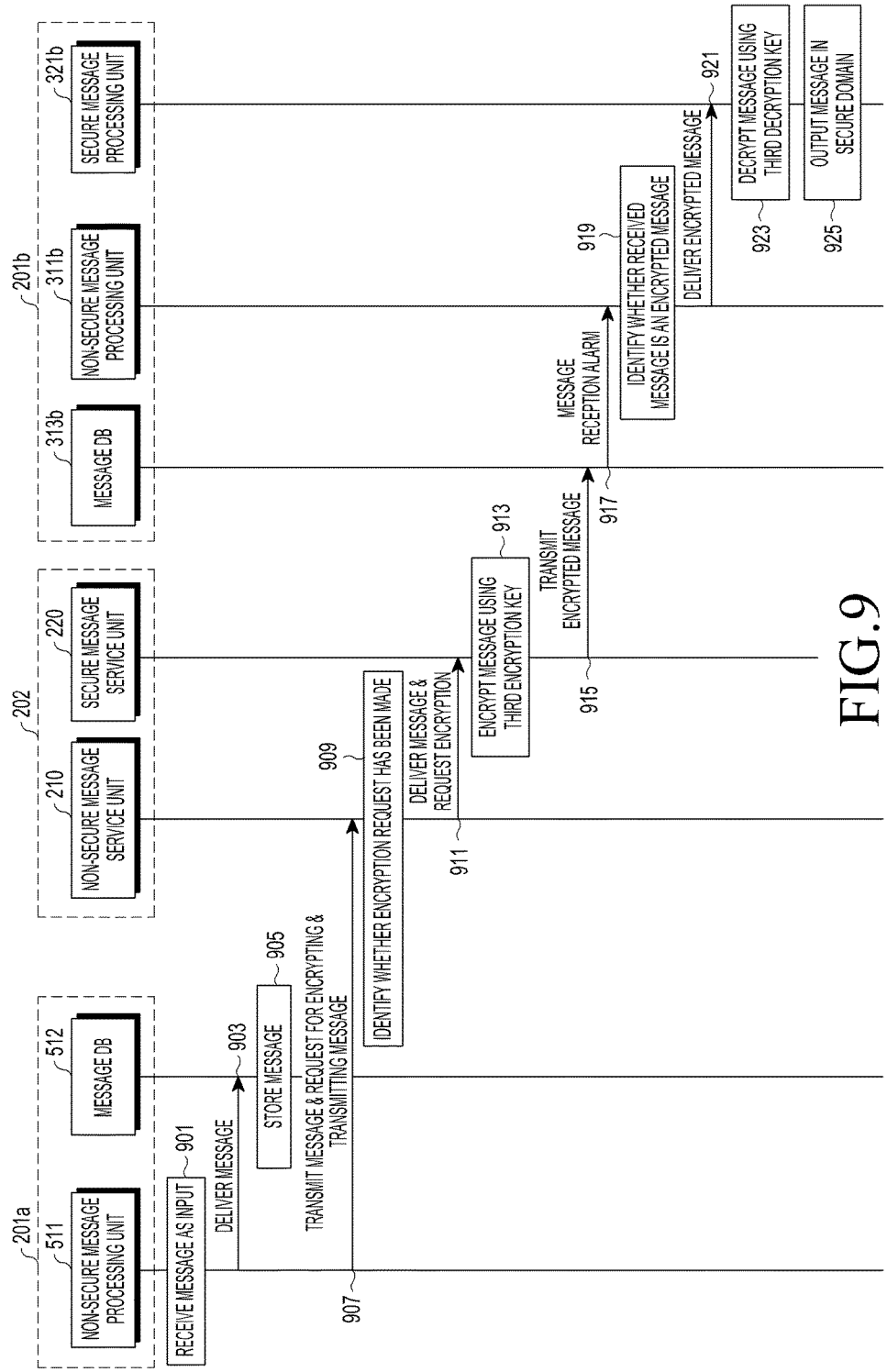
FIG. 9 is a signal flow diagram illustrating an example method of processing a secure message.

Operations of the non-secure message processing units 311a and 311b and those of the secure message processing units 321a and 321b will be described below in greater detail with reference to FIG. 7 to FIG. 9 illustrating an example method for transmitting an encrypted message among the transmission-side terminal 201a, the message service apparatus 202, and the reception-side terminal 201b.

Figure 4:
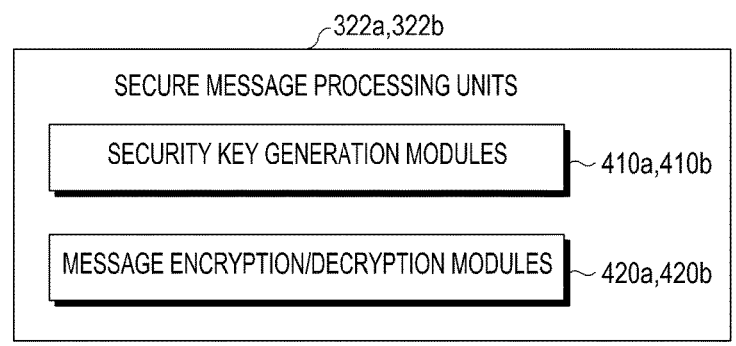
FIG. 4 is a block diagram illustrating an example schematic configuration of a secure message processing unit of each of the terminal apparatuses illustrated in FIG. 3.

FIG. 4 is a block diagram illustrating an example schematic configuration of a secure message processing unit of each of the terminal apparatuses illustrated in FIG. 3.

Referring to FIG. 4, the secure message processing units 321a and 321b of the respective terminal apparatuses 201a and 201b may include, for example, security key generation modules 410a and 410b and message encryption/decryption modules 420a and 420b. In the example, in order to distinguish the elements of the terminal apparatus 201a from those of the terminal apparatus 201b, the elements of the transmission-side terminal 201a are denoted by "a" and those of the reception-side terminal 201b are denoted by "b."

The security key generation modules (e.g., including processing circuitry) 410a and 410b may be configured generate a first encryption/decryption key pair based on a predetermined key generation algorithm in order to transmit a secure message between the transmission-side terminal 201a and the reception-side terminal 201b. For example, the security key generation module 410a of the transmission-side terminal 201a may, for example, generate a first decryption key using reception-side terminal information transmitted by the predetermined reception-side terminal 201b desiring to transmit a secure message, or using information pre-agreed between the transmission-side terminal 201a and the reception-side terminal 201b. The security key generation module 410b of the reception-side terminal 201b may, for example, generate a first encryption key corresponding to the first decryption key using transmission-side terminal information transmitted by the transmission-side terminal 201a, or using information pre-agreed between the reception-side terminal 201b and the transmission-side terminal 201a. The generated first encryption/decryption keys may be exchanged between the communication units 301a and 301b of the respective terminal apparatuses 201a and 201b, and may be stored in the respective security key storage units 323a and 323b. For example, the first encryption key may be stored in the security key storage unit 323a of the transmission-side terminal 201a, and the first decryption key may be stored in the security key storage unit 323b of the reception-side terminal 201b.

The security key generation module 410a of the transmission-side terminal 201a may generate a second decryption key based on a predetermined key generation algorithm in order to transmit a secure message between the transmission-side terminal 201a and the message service apparatus 202. For example, the security key generation module 410*a* of the transmission-side terminal 201*a* may be configured to generate the second decryption key using server information of the message service apparatus 202 transmitted by the message service apparatus 202 desiring to transmit a secure message, or using information pre-agreed between the transmission-side terminal 201*a* and the message service apparatus 202. The message service apparatus 202 may, for example, generate a second encryption key corresponding to the second decryption key using transmission-side terminal information transmitted by the transmission-side terminal 201*a*, or using information pre-agreed between the message service apparatus 202 and the transmission-side terminal 201*a*. The generated second encryption/decryption key pair may be exchanged between the transmission-side terminal 201*a* and the message service apparatus 202, the second encryption key may be stored in the security key storage unit 323*a* of the transmission-side terminal 201*a*, and the second decryption key may be stored in the message service apparatus 202 (e.g., a security key storage module 620).

The security key generation module 410*b* of the reception-side terminal 201*b* may, for example, generate a third encryption key pair based on a predetermined key generation algorithm in order to transmit a secure message between the reception-side terminal 201*b* and the message service apparatus 202. For example, the security key generation module 410*b* of the reception-side terminal 201*b* may generate the third encryption key using server information of the message service apparatus 202 transmitted by the message service apparatus 202 that receives a secure message, or using information pre-agreed between the reception-side terminal 201*b* and the message service apparatus 202. The message service apparatus 202 may generate a third decryption key corresponding to the third encryption key using transmission-side terminal information transmitted by the reception-side terminal 201*b*, or using information pre-agreed between the message service apparatus 202 and the transmission-side terminal 201*a*. The third encryption/decryption key pair may be exchanged between the reception-side terminal 201*b* and the message service apparatus 202, the third encryption key may be stored in the message service apparatus 202 (e.g., the security key storage module 620), and the third decryption key may be stored in the security key storage unit 323*b* of the reception-side terminal 201*b*.

The first to third encryption/decryption key pairs may be generated and exchanged by using various methods based on various key generation algorithms in addition to the above-described example method.

The message encryption/decryption modules 420*a* and 420*b* may encrypt and transmit a message, which is input in the secure domains 320*a* and 320*b*, by using the multiple encryption/decryption key pairs generated by the security key generation modules 410*a* and 410*b*. The message encryption/decryption modules 420*a* and 420*b* may decrypt an encrypted message and may output the decrypted message in the secure domains 320*a* and 320*b*.

The message encryption/decryption module 420*a* of the transmission-side terminal 201*a* may encrypt a message using the first encryption key or the second encryption key, and may deliver the encrypted message to the reception-side terminal 201*b* through the message service apparatus 202.

The message encryption/decryption module 420*b* of the reception-side terminal 201*b* may decrypt the encrypted message, which has been delivered by the message service apparatus 202, using the first decryption key or the third decryption key.

Figure 5:
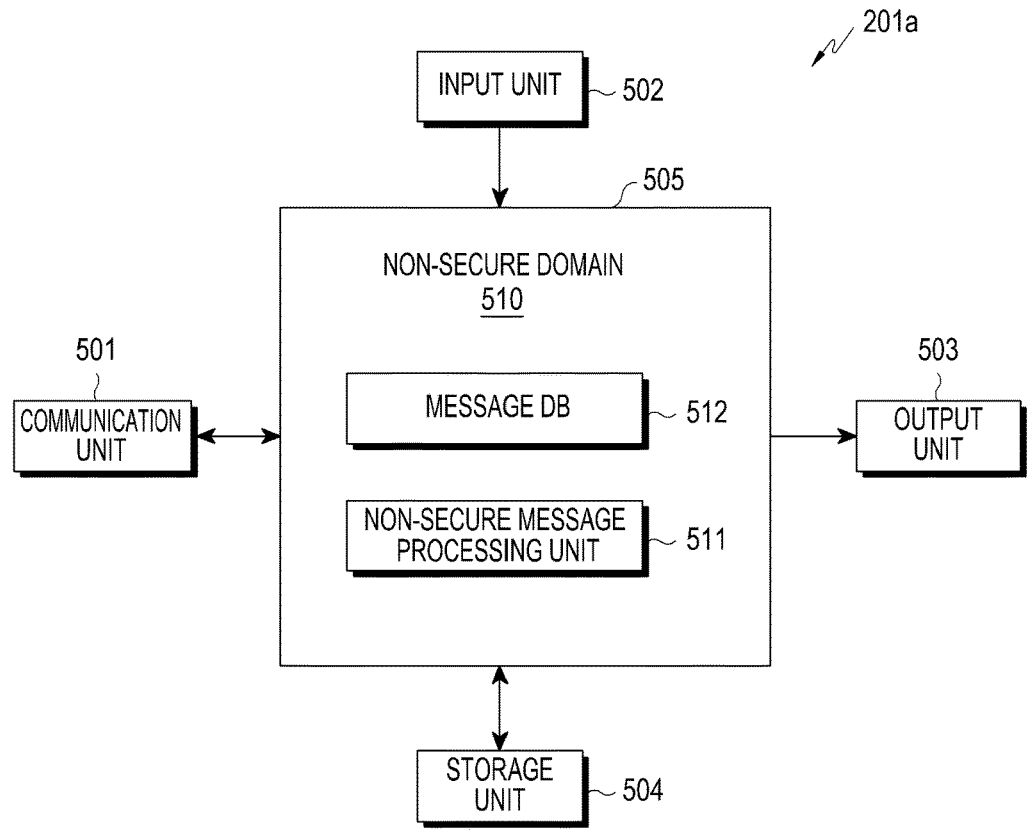
FIG. 5 is a block diagram illustrating an example schematic configuration of a transmission-side terminal.

FIG. 5 is a block diagram illustrating an example schematic configuration of a transmission-side terminal.

Referring to FIG. 5, the transmission-side terminal 201*a* may include a communication unit (e.g., including communication circuitry) 501, an input unit (e.g., including input circuitry) 502, an output unit (e.g., including output circuitry) 503, a storage unit 504, and a control unit (e.g., including control and/or processing circuitry) 505, and may be identical to the transmission-side terminal 201*a* illustrated in FIG. 3, except that the control unit 505 is configured using only a non-secure domain 510 which is based on a normal operating system. A detailed description of the elements identical to those of the transmission-side terminal 201*a* illustrated in FIG. 3 will be replaced by the above description.

The control unit 505 may include a non-secure message processing unit (e.g., processor and/or processing circuitry) 511 and a message DB 512 installed in the non-secure domain 510. Differently from the transmission-side terminal 201*a* of FIG. 3, the transmission-side terminal 201*a* of FIG. 5 configured using only the non-secure domain 510, which is based on a normal operating system, may transmit a message, which requires security, and a request for encrypting the message together to the message service apparatus 202 using the non-secure message processing unit 511, in order to transmit the relevant message to the reception-side terminal 201*b*.

Based on the message and the request for encrypting the message which have been transmitted by the non-secure message processing unit 511, the message service apparatus 202 may encrypt the message using the third encryption key for transmitting a secure message between the message service apparatus 202 and the reception-side terminal 201*b*, and may transmit the encrypted message to the reception-side terminal 201*b*. The reception-side terminal 201*b* may decrypt the encrypted message using the third decryption key, may output the decrypted message, and thereby may securely transmit a message, the transmission of which has been requested by the transmission-side terminal 201*a*, to the reception-side terminal 201*b*.

Figure 6:
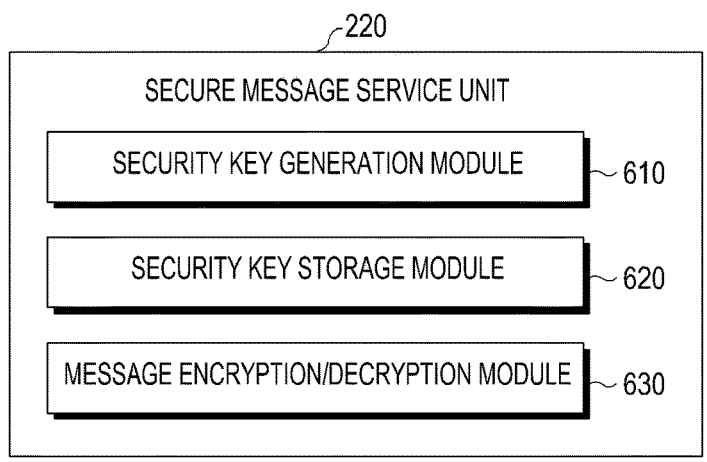
FIG. 6 is a block diagram illustrating an example schematic configuration of a secure message service unit of a message service apparatus.

FIG. 6 is a block diagram illustrating an example schematic configuration of a secure message service unit of an example message service apparatus.

Referring to FIG. 6, the secure message service unit 220 may include a security key generation module (e.g., including processing circuitry) 610, a security key storage module 620, and a message encryption/decryption module (e.g., including processing circuitry) 630.

The security key generation module 610 may, for example, generate a second encryption key based on a predetermined key generation algorithm in order to transmit a secure message between the message service apparatus 202 and the transmission-side terminal 201*a*. For example, the security key generation module 610 may generate the second encryption key using transmission-side terminal information from the transmission-side terminal 201*a* desiring to transmit a secure message, or using information pre-agreed between the message service apparatus 202 and the transmission-side terminal 201*a*. The transmission-side terminal 201*a* may, for example, generate a second decryption key corresponding to the second encryption key using server information of the message service apparatus 202 transmitted by the message service apparatus 202, or using information pre-agreed between the transmission-side terminal 201*a* and the message service apparatus 202. The generated second encryption/decryption keys may be exchanged between the transmission-side terminal 201*a* and the message service apparatus 202, the second encryption key may be stored in the security key storage unit 323a of the transmission-side terminal 201a, and the second decryption key may be stored in the security key storage module 620 of the secure message service unit 220 of the message service apparatus 202.

The security key generation module 610 may, for example, generate a third decryption key based on a predetermined key generation algorithm in order to transmit a secure message between the message service apparatus 202 and the reception-side terminal 201b. For example, the security key generation module 610 may generate the third decryption key using reception-side terminal information from the reception-side terminal 201b desiring to transmit a secure message, or using information pre-agreed between the message service apparatus 202 and the reception-side terminal 201b. The reception-side terminal 201b may generate a third encryption key corresponding to the third decryption key using server information of the message service apparatus 202 transmitted by the message service apparatus 202, or by using information pre-agreed between the reception-side terminal 201b and the message service apparatus 202. The generated third encryption/decryption keys may be exchanged between the reception-side terminal 201b and the message service apparatus 202, the third encryption key may be stored in the security key storage module 620 of the secure message service unit 220 of message service apparatus 202, and the third decryption key may be stored in the security key storage unit 323b of the reception-side terminal 201b.

The security key storage module 620 may store an encryption/decryption key pair generated by the security key generation module 610 or an exchanged encryption/decryption key pair from the transmission-side terminal 201a and the reception-side terminal 201b. For example, the security key storage module 620 may store a second encryption/decryption key pair, which is generated or exchanged in order to transmit a secure message between the transmission-side terminal 201a and the message service apparatus 202, and a third encryption/decryption key pair which is generated or exchanged in order to transmit a secure message between the message service apparatus 202 and the reception-side terminal 201b.

When a request is made for encrypting a message transmitted by the transmission-side terminal 201a, the message encryption/decryption module 630 may encrypt the message. When the encrypted message transmitted by the transmission-side terminal 201a does not include encryption/decryption keys for transmitting a secure message between the message service apparatus 202 and the reception-side terminal 201b, the message encryption/decryption module 630 may decrypt the encrypted message, and may re-encrypt the decrypted message using an encryption key for transmitting a secure message between the message service apparatus 202 and the reception-side terminal 201b. The re-encrypted message may be transmitted to the reception-side terminal 201b, and may be decrypted using a decryption key for transmitting a secure message between the message service apparatus 202 and the reception-side terminal 201b.

An operation of the message encryption/decryption module 630 will be described below in greater detail with reference to FIG. 7 to FIG. 9 illustrating an example method for transmitting a secure message among the transmission-side terminal 201a, the message service apparatus 202, and the reception-side terminal 201b.

FIG. 7 is a signal flow diagram illustrating an example method for processing a secure message, and illustrates an example method for processing a secure message using a security key (e.g., a first encryption/decryption key pair) which is generated and exchanged in order to transmit a secure message between the transmission-side terminal 201a and the reception-side terminal 201b.

Referring to FIG. 7, when the transmission-side terminal 201a desires to transmit a message requiring security to the predetermined reception-side terminal 201b, the transmission-side terminal 201a executes an application for transmitting a secure message.

When the application is executed, in operation 701, the transmission-side terminal 201a operates the secure message processing unit 321a installed in a secure domain which is based on a secure operation system, and securely receives a message as input through the input unit 302a.

In operation 701, when the execution of the application activates the secure domain 320a, the non-secure domain 310a, which is based on a normal operating system and is physically separated from the secure domain 320a, is deactivated, and the non-secure message processing unit 311a installed in the non-secure domain 310a may not operate either. The input unit 302a receives an input signal, such as a message which is input, under the control of the secure message processing unit 321a or the non-secure message processing unit 311a. When the input unit 302a is controlled by the secure message processing unit 321a, the input unit 302a may be blocked from all accesses to an input signal by the non-secure message processing unit 311a using an isolation environment physically separated from the secure message processing unit 321a. When the input unit 302a is controlled by the non-secure message processing unit 311a, the input unit 302a may be blocked from all accesses to an input signal by the secure message processing unit 321a. Accordingly, access in the non-secure domain 310a physically separated from the secure domain 320a may be blocked using the physical isolation environment, and thereby the secure message processing unit 321a may securely receive, as input, a message which is input through the input unit 302a in the secure domain.

In operation 703, the secure message processing unit 321a may encrypt the message, which has been received as input in operation 701, using a first encryption key. The first encryption key is one key of a first encryption/decryption key pair generated and exchanged in order to transmit a secure message between the transmission-side terminal 201a and the reception-side terminal 201b desiring to transmit the encrypted message. The first encryption key may include terminal information of the reception-side terminal 201b, or may be generated using the terminal information of the reception-side terminal 201b or information pre-agreed between the transmission-side terminal 201a and the reception-side terminal 201b.

In operation 705, the secure message processing unit 321a may deliver, to the non-secure message processing unit 311a, the message encrypted in operation 703 and a transmission request for transmitting the encrypted message to the reception-side terminal 201b.

The non-secure message processing unit 311a delivers the encrypted message, which has been delivered by the secure message processing unit 321a in operation 705, to the message DB 313a in operation 707, and stores the encrypted message in the message DB 313a in operation 709. In operation 711, the non-secure message processing unit 311a transmits, to the message service apparatus 202, the encrypted message and the transmission request for the encrypted message.

In operation 713, the non-secure message service unit 210 of the message service apparatus 202 receives the message and the transmission request for the message, which have been transmitted by the transmission-side terminal 201a, and identifies whether the received message is an encrypted message.

When it is determined in operation 713 that the received message is an encrypted message, the non-secure message service unit 210 delivers the encrypted message to the secure message service unit 220 in operation 715, and the secure message service unit 220 transmits the delivered encrypted message to the reception-side terminal in operation 717.

The reception-side terminal 201b receives the encrypted message transmitted by the message service apparatus 202, and stores the encrypted message in the message DB 313b of the reception-side terminal 201b. When the message DB 313b receives the message, in operation 719, the message DB 313b may deliver an alarm, which provides a notification of reception of the message, to the non-secure message processing unit 311b.

When receiving the message reception alarm from the message DB 313b, in operation 721, the non-secure message processing unit 311b of the reception-side terminal 201b identifies whether the received message is an encrypted message. When the received message is an encrypted message, in operation 723, the non-secure message processing unit 311b delivers the encrypted message to the secure message processing unit 321b.

The secure message processing unit 321b of the reception-side terminal 201b decrypts the encrypted message using the first decryption key corresponding to the first encryption key in operation 725, and then outputs the decrypted message through the output unit 303b in the secure domain 320b in operation 727.

The message, which is output from the output unit 303b, is output under the control of the secure message processing unit 321b installed in the secure domain which is based on a secure operating system, and thus any access from the physically-isolated non-secure domain to the output unit 303b is blocked. Accordingly, it is possible to pre-empt and/or reduce or avoid the leakage of an output message, such as screen capture.

FIGS. 8A and 8B are signal flow diagrams illustrating an example method for processing a secure message, and illustrate an example method for processing a secure message using a security key (e.g., a second encryption/decryption key pair), which is generated and exchanged in order to transmit a secure message between the transmission-side terminal 201a and the message service apparatus 202, and a security key (e.g., a third encryption/decryption key pair) which is generated and exchanged in order to transmit a secure message between the message service apparatus 202 and the reception-side terminal 201b.

Referring to FIG. 8, when the transmission-side terminal 201a desires to transmit a message requiring security to the predetermined reception-side terminal 201b, the transmission-side terminal 201a executes an application for transmitting a secure message.

When the application is executed, in operation 801, the transmission-side terminal 201a operates the secure message processing unit 321a installed in the secure domain which is based on the secure operating system, and securely receives a message as input through the input unit 302a. Operation 801 is substantially similar to operation 701 illustrated in FIG. 7, and thus a detailed description of operation 801 will be replaced by the above description of operation 701.

In operation 803, the secure message processing unit 321a may encrypt the message, which has been received as input in operation 801, using a second encryption key. In the example, the second encryption key is one key of a second encryption/decryption key pair generated and exchanged in order to transmit a secure message between the transmission-side terminal 201a and the message service apparatus 202. The second encryption key may include server information of the message service apparatus 202, or may be generated using the server information of the message service apparatus 202 and information pre-agreed between the transmission-side terminal 201a and the message service apparatus 202.

In operation 805, the secure message processing unit 321a may deliver, to the non-secure message processing unit 311a, the message encrypted in operation 803 and a transmission request for transmitting the encrypted message to the reception-side terminal 201b.

In operation 807, the non-secure message processing unit 311a delivers the encrypted message, which has been delivered by the secure message processing unit 321a in operation 805, to the message DB 313a, and stores the encrypted message in the message DB 313a in operation 809. Simultaneously, in operation 811, the non-secure message processing unit 311a transmits, to the message service apparatus 202, the encrypted message and the transmission request for the encrypted message in operation 811.

In operation 813, the non-secure message service unit 210 of the message service apparatus 202 receives the message and the transmission request for the message, which have been transmitted by the transmission-side terminal 201a, and identifies whether the received message is an encrypted message.

When it is identified in operation 813 that the received message is an encrypted message, in operation 815, the non-secure message service unit 210 delivers the encrypted message to the secure message service unit 220.

In operation 817, the secure message service unit 220 decrypts the encrypted message using a second decryption key.

In operation 817, the second decryption key is one key of a second encryption/decryption key pair generated and exchanged in order to transmit a secure message between the transmission-side terminal 201a and the message service apparatus 202. The second decryption key may include terminal information of the transmission-side terminal 201a, or may be generated by using the terminal information of the transmission-side terminal 201a and information pre-agreed between the message service apparatus 202 and the transmission-side terminal 201a.

In operation 819, the secure message service unit 220 re-encrypts the decrypted message using a third encryption key.

In example operation 819, the third encryption key is one key of a third encryption/decryption key pair generated and exchanged in order to transmit a secure message between the message service apparatus 202 and the reception-side terminal 201b. The third encryption key may include terminal information of the reception-side terminal 201b, or may be generated by using the terminal information of the reception-side terminal 201b or information pre-agreed between the message service apparatus 202 and the reception-side terminal 201b.

In operation 821, the secure message service unit 220 transmits, to the reception-side terminal 201b, the message re-encrypted in operation 819.

The reception-side terminal 201b receives the re-encrypted message transmitted by the message service apparatus 202, and stores the re-encrypted message in the message DB 313b. When the message DB 313b receives the message, in operation 823, the message DB 313b may deliver an alarm, which provides a notification of the reception of the message, to the non-secure message processing unit 311b.

When the non-secure message processing unit 311b of the reception-side terminal 201b receives the message reception alarm from the message DB 313b, in operation 825, the non-secure message processing unit 311b identifies whether the received message is an encrypted message. When the received message is an encrypted message, in operation 827, the non-secure message processing unit 311b delivers the re-encrypted message to the secure message processing unit 321b.

In operation 829, the secure message processing unit 321b of the reception-side terminal 201b decrypts the re-encrypted message using the third decryption key.

In operation 829, the third decryption key is one key of a third encryption/decryption key pair generated and exchanged in order to transmit a secure message between the message service apparatus 202 and the reception-side terminal 201b. The third decryption key may include server information of the message service apparatus 202, or may be generated by using the server information of the message service apparatus 202 or information pre-agreed between the reception-side terminal 201b and the message service apparatus 202.

In operation 831, the secure message processing unit 321b of the reception-side terminal 201b outputs the decrypted message through the output unit 303b in the secure domain.

The message, which is output from the output unit 303b, is output under the control of the secure message processing unit 321b installed in the secure domain which is based on the secure operating system, and thus any access from the physically-isolated non-secure domain to the output unit 303b is blocked. Accordingly, it is possible to pre-empt and/or reduce or avoid the leakage of an output message, such as screen capture.

FIG. 9 is a signal flow diagram illustrating an example method for processing a secure message, and illustrates an example method for processing a secure message using a security key (e.g., a third encryption/decryption key pair) generated and exchanged in order to transmit a secure message between the message service apparatus 202 and the reception-side terminal 201b when, as illustrated in FIG. 5, a separate secure domain does not exist in the transmission-side terminal 201a and the transmission-side terminal 201a is configured using only the non-secure domain 510 which is based on a normal operating system.

Referring to FIG. 9, when the transmission-side terminal 201a desires to transmit a message requiring security to the predetermined reception-side terminal 201b, in operation 901, the transmission-side terminal 201a operates the non-secure message processing unit 511, and receives a message as input through the input unit 502.

The non-secure message processing unit 511 delivers the received message to the message DB 512 in operation 903, and stores the message in the message DB 512 in operation 905. In operation 907, the non-secure message processing unit 511 transmits, to the message service apparatus 202, the input message and a request for encrypting and transmitting the input message.

When the message service apparatus 202 receives the message transmitted by the transmission-side terminal 201a, in operation 909, the non-secure message service unit 210 identifies whether a request has been made for encrypting the received message. When the request has been made for encrypting the received message, in operation 911, the non-secure message service unit 210 delivers the message to the secure message service unit 220.

In operation 913, the secure message service unit 220 encrypts the delivered message using a third encryption key.

In operation 913, the third encryption key is one key of a third encryption/decryption key pair generated and exchanged in order to transmit a secure message between the message service apparatus 202 and the reception-side terminal 201b. The third encryption key may include reception-side terminal information of the reception-side terminal 201b, or may be generated to include the reception-side terminal information of the reception-side terminal 201b or information pre-agreed between the message service apparatus 202 and the reception-side terminal 201b. In operation 915, the secure message service unit 220 transmits, to the reception-side terminal 201b, the message encrypted using the third encryption key.

The reception-side terminal 201b receives the encrypted message transmitted by the message service apparatus 202, and stores the encrypted message in the message DB 313b. When the message DB 313b receives the encrypted message, in operation 917, the message DB 313b may deliver an alarm, which provides a notification of the reception of the message, to the non-secure message processing unit 311b.

When the non-secure message processing unit 311b of the reception-side terminal 201b receives the message reception alarm from the message DB 313b, in operation 919, the non-secure message processing unit 311b identifies whether the received message is an encrypted message. When the received message is an encrypted message, in operation 921, the non-secure message processing unit 311b delivers the encrypted message to the secure message processing unit 321b.

In operation 923, the secure message processing unit 321b of the reception-side terminal 201b decrypts the encrypted message using the third decryption key corresponding to the third encryption key.

In operation 923, the third decryption key is one key of the third encryption/decryption key pair generated and exchanged in order to transmit a secure message between the message service apparatus 202 and the reception-side terminal 201b. The third decryption key may include server information of the message service apparatus 202, or may include information pre-agreed between the message service apparatus 202 and the reception-side terminal 201b.

In operation 925, the secure message processing unit 321b of the reception-side terminal 201b outputs the decrypted message through the output unit 303b in the secure domain.

The message, which is output from the output unit 303b, is output under the control of the secure message processing unit 321b installed in the secure domain which is based on the secure operating system, and thus any access from the physically-isolated non-secure domain to the output unit 303b is blocked. Accordingly, it is possible to pre-empt and/or reduce or avoid the leakage of an output message, such as screen capture.

Figure 10:
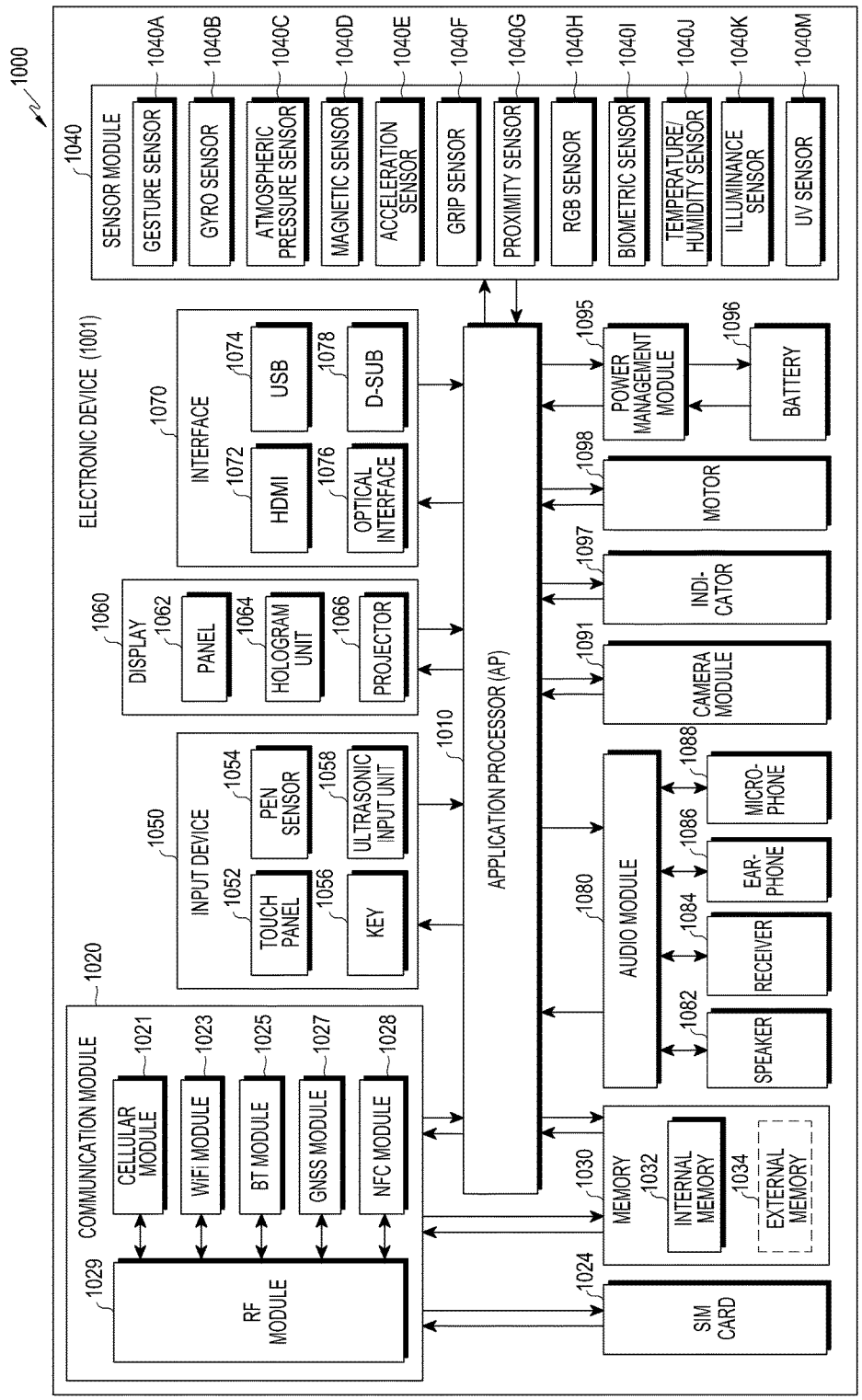
FIG. 10 is a block diagram illustrating an example configuration of an electronic apparatus.

FIG. 10 is a block diagram illustrating an example configuration of an example electronic apparatus 1001. For example, the electronic apparatus 1001 may include the whole or part of the electronic apparatus 101 illustrated in FIG. 1. The electronic apparatus 1001 may include at least one processor (e.g., an Application Processor (AP)) 1010, a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may be configured to control multiple hardware or software elements connected to the processor 1010 by running, for example, an Operation System (OS) or an application program, and may be configured to perform the processing of and arithmetic operations on various data. The processor 1010 may, for example, be implemented by, for example, a System on Chip (SoC). According to an example embodiment of the disclosure, the processor 1010 may further include a Graphical Processing Unit (GPU) and/or an image signal processor (not shown). The processor 1010 may include at least some (e.g., a cellular module 1021) of the elements illustrated in FIG. 10. The processor 1010 may be configured to load, into a volatile memory, instructions or data received from at least one (e.g., a non-volatile memory) of the other elements and may process the loaded instructions or data, and may store various data in a non-volatile memory.

The communication module 1020 may have a configuration identical or similar to that of the communication interface 170 illustrated in FIG. 1. The communication module 1020 may include, for example, the cellular module 1021, a Wi-Fi module 1023, a Bluetooth (BT) module 1025, a GNSS module 1027 (e.g., a GPS module, a Glonass module, a Beidou module, or a Galileo module), an NFC module 1028, and a Radio Frequency (RF) module 1029.

For example, the cellular module 1021 may provide a voice call, an image call, a text message service, an Internet service, and the like through a communication network. According to an example embodiment of the disclosure, the cellular module 1021 may identify or authenticate an electronic apparatus 1001 in the communication network by using the subscriber identification module (e.g., a Subscriber Identity Module (SIM) card) 1024. According to an example embodiment of the disclosure, the cellular module 1021 may perform at least some of the functions that the processor 1010 may provide. According to an example embodiment of the disclosure, the cellular module 1021 may include a Communication Processor (CP).

Each of the Wi-Fi module 1023, the BT module 1025, the GNSS module 1027, and the NFC module 1028 may include, for example, a processor for processing data transmitted and received through the relevant module. According to some example embodiments of the disclosure, at least some (e.g., two or more) of the cellular module 1021, the Wi-Fi module 1023, the BT module 1025, the GNSS module 1027, and the NFC module 1028 may be included in one Integrated Chip (IC) or IC package.

The RF module 1029 may transmit and receive, for example, communication signals (e.g., RF signals). The RF module 1029 may include, for example, a transceiver, a Power Amplifier Module (PAM), a frequency filter, a Low Noise Amplifier (LNA), and an antenna. According to another example embodiment of the disclosure, at least one of the cellular module 1021, the Wi-Fi module 1023, the BT module 1025, the GNSS module 1027, and the NFC module 1028 may transmit and receive RF signals through a separate RF module.

The subscriber identification module 1024 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 1030 (e.g., the memory 130) may include, for example, an internal memory 1032 and/or an external memory 1034. The internal memory 1032 may include at least one of, for example, a volatile memory (e.g., a Dynamic Random Access Memory (DRAM), a Static RAM (SRAM), a Synchronous DRAM (SDRAM), etc.); a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a Not AND (NAND) flash memory, a Not OR (NOR) flash memory, etc.); a hard drive; and a Solid State Drive (SSD).

The external memory 1034 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 1034 may be functionally and/or physically connected to the electronic apparatus 1001 through various interfaces.

For example, the sensor module 1040 may measure a physical quantity or may detect an operation state of the electronic apparatus 1001, and may convert the measured physical quantity or the detected operation state into an electrical signal. The sensor module 1040 may include at least one of, for example, a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red-Green-Blue (RGB) sensor), a biometric sensor 1040I, a temperature/humidity sensor 1040J, an illuminance sensor 1040K, and an Ultraviolet (UV) sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor, or the like. The sensor module 1040 may further include a control circuit for controlling one or more sensors included therein. In some example embodiments of the disclosure, the electronic apparatus 1001 may further include a processor configured to control the sensor module 1040 as a part of or separately from the processor 1010, and may control the sensor module 1040 while the processor 1010 is in a sleep state.

The input device 1050 may include, for example, a touch panel 1052, a (digital) pen sensor 1054, a key 1056, and an ultrasonic input unit 1058. The touch panel 1052 may use at least one of, for example, a capacitive scheme, a resistive scheme, an infrared scheme, and an acoustic wave scheme, or the like. The touch panel 1052 may further include a control circuit. The touch panel 1052 may further include a tactile layer and may provide a tactile response to the user.

The (digital) pen sensor 1054 may include, for example, a recognition sheet which is a part of the touch panel or is separated from the touch panel. The key 1056 may be, for example, a physical button, an optical key, and a keypad. The ultrasonic input unit 1058 may sense an ultrasonic wave generated by an input means through a microphone (e.g., the microphone 1088), and may confirm data corresponding to the sensed ultrasonic wave.

The display 1060 (e.g., the display 160) may include a panel 1062, a hologram unit 1064, and a projector 1066. The panel 1062 may include a configuration identical or similar to that of the display 160 illustrated in FIG. 1. The panel 1062 may be implemented to be, for example, flexible, transparent, or wearable, or the like. The panel 1062 and the touch panel 1052 may be implemented as one module. The hologram unit 1064 may display a three-dimensional image in the air by using the interference of light. The projector 1066 may display an image by projecting light onto a screen. The screen may be located, for example, inside or outside the electronic apparatus 1001. According to an example embodiment of the disclosure, the display 1060 may further include a control circuit for controlling the panel 1062, the hologram unit 1064, or the projector 1066.

The interface 1070 may include, for example, a High-Definition Multimedia Interface (HDMI) 1072, a Universal Serial Bus (USB) 1074, an optical interface 1076, and a D-subminiature (D-sub) 1078. The interface 1070 may be included in, for example, the communication interface 170 illustrated in FIG. 1. Additionally or alternatively, the interface 1070 may include, for example, a Mobile High-definition Link (MHL) interface, a Secure Digital (SD) card/Multi-Media Card (MMC) interface, or an Infrared Data Association (IrDA) standard interface.

For example, the audio module 1080 may bidirectionally convert a sound and an electrical signal. At least some elements of the audio module 1080 may be included in, for example, the input/output interface 150 illustrated in FIG. 1. The audio module 1080 may process sound information which is input or output through, for example, a speaker 1082, a receiver 1084, an earphone 1086, the microphone 1088, or the like.

The camera module 1091 may, for example, be a device capable of capturing a still image and/or a moving image. According to an example embodiment of the disclosure, the camera module 1091 may include one or more image sensors (e.g., a front sensor or a back sensor), a lens, an Image Signal Processor (ISP), and a flash (e.g., an LED, a xenon lamp, or the like).

The power management module 1095 may manage, for example, power of the electronic apparatus 1001. According to an example embodiment of the disclosure, the power management module 1095 may include a Power Management Integrated Circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery fuel gauge may measure, for example, a residual quantity of the battery 1096, and a voltage, a current, or a temperature during the charging. Examples of the battery 1096 may include a rechargeable battery and a solar battery.

The indicator 1097 may display a particular state (e.g., a booting state, a message state, a charging state, or the like) of the electronic apparatus 1001 or a part (e.g., the processor 1010) of the electronic apparatus 1001. The motor 1098 may convert an electrical signal into mechanical vibration, and may generate vibration, a haptic effect, or the like. Although not illustrated, the electronic apparatus 1001 may include a processing unit (e.g., a GPU) for supporting a mobile television (TV). The processing unit for supporting a mobile TV may process media data according to a standard, such as, for example, Digital Multimedia Broadcasting (DMB), Digital Video Broadcasting (DVB), or mediaFLO™.

Each of the above-described component elements of hardware according to the disclosure may be configured with one or more components, and the names of the corresponding component elements may vary based on the type of electronic device. The electronic device according to various example embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 11:
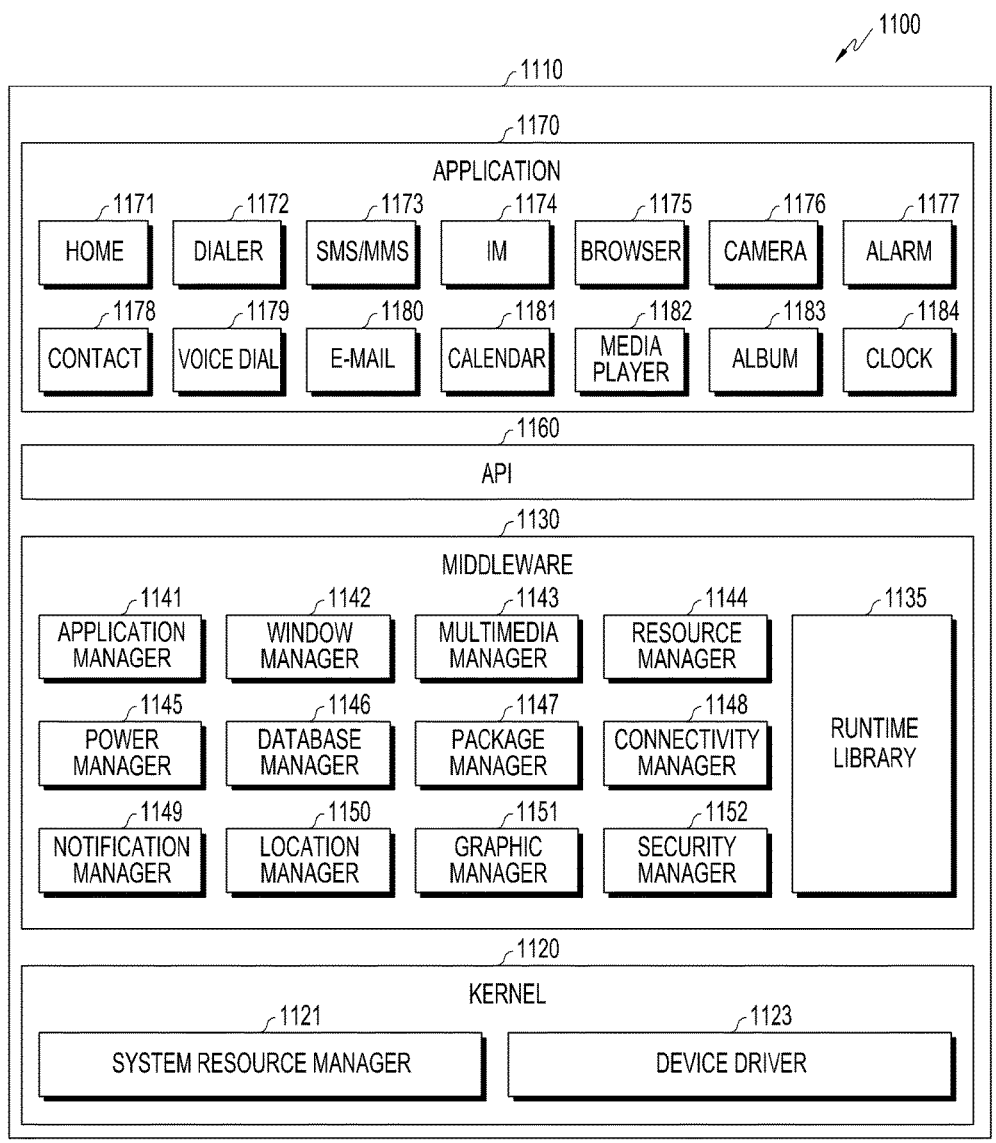
FIG. 11 is a block diagram illustrating an example configuration of a program module.

FIG. 11 is a block diagram illustrating an example configuration of an example program module. According to an example embodiment of the disclosure, the program module 1110 (e.g., the program 140) may include an OS for controlling resources related to the electronic apparatus (e.g., the electronic apparatus 101) and/or various applications (e.g., the application programs 147) executed in the OS. The OS may be, for example, Android, iOS, Windows, Symbian, Tizen, Bada, and the like.

The program module 1110 may include a kernel 1120, middleware 1130, an API 1160, and/or an application 1170. At least some of the program module 1110 may be preloaded on the electronic apparatus, or may be downloaded from an external electronic apparatus (e.g., the electronic apparatus 103 or 104, or the server 106).

The kernel 1120 (e.g., the kernel 141) may include, for example, a system resource manager 1121 and/or a device driver 1123. The system resource manager 1121 may perform the control, allocation, retrieval, or the like of system resources. According to an example embodiment of the disclosure, the system resource manager 1121 may include a process manager, a memory manager, a file system manager, or the like. The device driver 1123 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 1130 may provide a function required in common by the applications 1170, or may provide various functions to the applications 1170 through the API 1160 so as to enable the applications 1170 to efficiently use the limited system resources within the electronic apparatus. According to an example embodiment of the disclosure, the middleware 1130 (e.g., the middleware 143) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module that a complier uses to add a new function by using a programming language during the execution of the application 1170. The runtime library 1135 may perform input/output management, memory management, the functionality for an arithmetic function, or the like.

The application manager 1141 may manage, for example, the life cycle of at least one of the applications 1170. The window manager 1142 may manage Graphical User Interface (GUI) resources used for the screen. The multimedia manager 1143 may determine a format required to reproduce various media files, and may encode or decode a media file by using a coder/decoder (codec) appropriate for the relevant format. The resource manager 1144 may manage resources, such as a source code, a memory, a storage space, and the like of at least one of the applications 1170.

For example, the power manager 1145 may operate together with a Basic Input/Output System (BIOS), etc. and may manage a battery or power, and may provide power information and the like required for an operation of the electronic apparatus. The database manager 1146 may generate, search for, and/or change a database to be used by at least one of the applications 1170. The package manager 1147 may manage the installation or update of an application distributed in the form of a package file.

The connectivity manager 1148 may manage a wireless connection such as, for example, Wi-Fi or Bluetooth. The notification manager 1149 may display or notify of an event, such as an arrival message, an appointment, a proximity notification, and the like, in such a manner as not to disturb the user. The location manager 1150 may manage location information of the electronic apparatus. The graphic manager 1151 may manage a graphic effect, which is to be provided to the user, or a user interface related to the graphic effect. The security manager 1152 may provide various security functions required for system security, user authentication, and the like. According to an embodiment of the present disclosure, when the electronic apparatus (e.g., the electronic apparatus 101) has a telephone call function, the middleware 1130 may further include a telephony manager for managing a voice call function or a video call function of the electronic apparatus.

The middleware 1130 may include a middleware module that forms a combination of various functions of the above-described elements. The middleware 1130 may provide a module specialized for each type of OS in order to provide a differentiated function. Also, the middleware 1130 may dynamically delete some of the existing elements, or may add new elements.

The API 1160 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 1170 (e.g., the application programs 147) may include one or more applications capable of performing functions, such as, for example, a home 1171, a dialer 1172, an SMS/MMS 1173, an Instant Message (IM) 1174, a browser 1175, a camera 1176, an alarm 1177, a contact 1178, a voice dialer 1179, an email 1180, a calendar 1181, a media player 1182, an album 1183, a clock 1184, health care (e.g., which measures an exercise quantity, a blood sugar level, or the like) (not shown), and providing of environmental information (e.g., information on atmospheric pressure, humidity, temperature, or the like) (not shown).

According to an example embodiment of the disclosure, the applications 1170 may include an application (hereinafter, referred to as an "information exchange application" for convenience of description) supporting information exchange between the electronic apparatus (e.g., the electronic apparatus 101) and an external electronic apparatus (e.g., the electronic apparatus 103 or 104). Examples of the information exchange application may include a notification relay application for delivering particular information to an external electronic apparatus and a device management application for managing an external electronic apparatus.

For example, the notification relay application may include a function of delivering, to the external electronic apparatus (e.g., the electronic apparatus 103 or 104), notification information generated by other applications (e.g., an SMS/MMS application, an email application, a health care application, an environmental information application, etc.) of the electronic apparatus 101. Also, for example, the notification relay application may receive notification information from the external electronic apparatus and may provide the received notification information to the user.

The device management application may manage (e.g., install, delete, or update), for example, at least one function (e.g., turning on/off the external electronic apparatus itself (or some component parts thereof) or adjusting the brightness (or resolution) of the display) of the external electronic apparatus (e.g., the electronic apparatus 103 or 104) communicating with the electronic apparatus, an application executed in the external electronic apparatus, or a service (e.g., a telephone call service, a message service, or the like) provided by the electronic apparatus.

According to an example embodiment of the disclosure, the application 1170 may include an application (e.g., a health care application of a mobile medical device or the like) designated according to an attribute of the external electronic apparatus (e.g., the electronic apparatus 103 or 104). According to an example embodiment of the disclosure, the application 1170 may include an application received from the external electronic apparatus (e.g., the server 106, or the electronic apparatus 103 or 104). According to an example embodiment of the disclosure, the application 1170 may include a preloaded application or a third party application which can be downloaded from the server. Names of the elements of the program module 1110, according to the above-described embodiments of the present disclosure, may change depending on the type of OS.

According to various example embodiments of the disclosure, at least some of the program module 1110 may be implemented in software, firmware, hardware (e.g., circuitry), or a combination of two or more thereof. At least some of the program module 1110 may be implemented (e.g., executed) by, for example, the processor (e.g., the processor 1010). At least some of the program module 1110 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the disclosure may be implemented by a command(s) stored in a computer-readable storage medium in a programming module form. The instruction(s), when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high level language codes, which can be executed in a computer using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various example embodiments of the disclosure may be executed sequentially, in parallel, repeatedly, or in a heuristic manner. Further, some operations may be executed according to another order or may be omitted, or other operations may be added. Various example embodiments disclosed herein are provided merely to easily describe technical details of the disclosure and to help the understanding of the disclosure, and are not intended to limit the scope of the disclosure. Accordingly, the scope of the disclosure should be construed as including all modifications or various other example embodiments based on the technical idea of the disclosure.

What is claimed is:

1. A transmission-side terminal comprising:
    communication circuitry configured to transmit/receive an encrypted message; and
    a controller comprising processing circuitry and having a secure domain and a non-secure domain, said secure domain being based on a secure operating system and said non-secure domain being based on a non-secure operating system, said secure domain and said non-secure domain being physically separated from each other, said processing circuitry configured to receive a message as input in the secure domain and to encrypt the received message, and to deliver the encrypted message to the non-secure domain and to transmit the encrypted message to a message service apparatus through the communication circuitry,
    wherein the processing circuitry is configured to deactivate the non-secure domain upon execution of an application that activates the secure domain, so that input circuitry for receiving the message as input is blocked from accesses by the non-secure domain.

2. The transmission-side terminal as claimed in claim 1, wherein the controller comprises:
    secure message processing circuitry in the secure domain, said secure message processing circuitry configured to receive the message as input, and to encrypt the received message using a first encryption key generated based on information transmitted by a reception-side terminal, or to encrypt the received message using a second encryption key generated based on information transmitted by the message service apparatus;
    a security key storage in the secure domain, said security key storage storing the first encryption key and the second encryption key; and
    non-secure message processing circuitry in the non-secure domain, said non-secure message processing circuitry configured to receive the encrypted message delivered by the secure message processing circuitry and to transmit the encrypted message to the message service apparatus.

3. A reception-side terminal comprising:
    communication circuitry configured to transmit/receive an encrypted message; and
    a control unit comprising processing circuitry and having a secure domain and a non-secure domain, said secure domain being based on a secure operating system and said non-secure domain being based on a non-secure operating system, said secure domain and said non-secure domain being physically separated from each other, said processing circuitry configured to decrypt the encrypted message received through the communication circuitry and to output the decrypted message in the secure domain via a display, so that access to the display by the non-secure domain is blocked when the decrypted message is output via the display so that the decrypted message cannot be screen captured.

4. The reception-side terminal as claimed in claim 3, wherein the control unit comprises:
    a message DataBase (DB) in the non-secure domain, said message DB storing the encrypted message received through the communication circuitry, and configured to deliver a message reception alarm;
    non-secure message processing circuitry in the non-secure domain, configured to determine through the message reception alarm whether the message stored in the message DB is an encrypted message, and to deliver the encrypted message to the secure domain when the message is the encrypted message; and
    secure message processing circuitry in the secure domain, configured to decrypt the encrypted message delivered by the non-secure message processing circuitry, using a first decryption key generated based on information transmitted by a transmission-side terminal, or to decrypt the encrypted message using a second decryption key generated based on information transmitted by a message service apparatus.

5. The reception-side terminal as claimed in claim 4, wherein the control unit is configured to control output circuitry to output the decrypted message in the secure domain through the secure message processing circuitry.

6. A method for processing a secure message in a transmission-side terminal, comprising:
    receiving a message as input and encrypting the message by a secure message processor in a secure domain based on a secure operating system and physically separated from a non-secure domain based on a non-secure operating system; and
    receiving the encrypted message;
    deactivating the non-secure domain upon execution of an application that activates the secure domain, so that accesses by the non-secure domain is blocked; and
    transmitting the encrypted message to a message service apparatus by a non-secure message processor in the non-secure domain.

7. The method as claimed in claim 6, wherein the encrypting of the message comprises encrypting, by the secure message processor, the message using a first encryption key generated based on information transmitted by a reception-side terminal.

8. The method as claimed in claim 6, wherein the encrypting of the message comprises encrypting, by the secure message processor, the message using a second encryption key, generated based on information transmitted by the message service apparatus.

9. A method for processing a secure message in a reception-side terminal, the method comprising:
- determining, by a non-secure message processor, whether a message transmitted by a message service apparatus is an encrypted message, said non-secure message processor being in a non-secure domain which is based on a non-secure operating system and being physically isolated from a secure domain which is based on a secure operating system;
- delivering, by the non-secure message processor, the encrypted message to the secure domain when the transmitted message is the encrypted message;
- receiving and decrypting the encrypted message; and
- outputting the decrypted message by a secure message processor in the secure domain via a display, so that access to the display by the non-secure domain is blocked when the decrypted message is output via the display so that the decrypted message cannot be screen captured.

10. The method as claimed in claim 9, wherein the decrypting of the encrypted message comprises decrypting, by the secure message processor, the encrypted message using a first decryption key generated based on information transmitted by a transmission-side terminal.

11. The method as claimed in claim 9, wherein the decrypting of the encrypted message comprises decrypting, by the secure processor, the encrypted message using a second decryption key generated based on information transmitted by the message service apparatus.

\* \* \* \* \*